(12) United States Patent
Ngai

(10) Patent No.: US 6,317,442 B1
(45) Date of Patent: Nov. 13, 2001

(54) DATA SWITCHING SYSTEM WITH CROSS BAR TRANSMISSION

(75) Inventor: Henry P. Ngai, Coto de Caza, CA (US)

(73) Assignee: Network Excellence for Enterprises Corp., Irvine, CA (US)

( * ) Notice: Subject to any disclaimer, the term of this patent is extended or adjusted under 35 U.S.C. 154(b) by 0 days.

(21) Appl. No.: 09/008,788

(22) Filed: Jan. 20, 1998

(51) Int. Cl.[7] ....................................................... H04J 3/16
(52) U.S. Cl. ................................................................ 370/518
(58) Field of Search ..................................... 370/465, 518, 370/351, 503, 428, 442, 342, 441, 514, 517, 516, 520, 519, 360, 464, 466, 467, 468, 469, 375, 384, 401; 375/355, 365, 368, 366, 364, 359, 145; 714/738, 739, 452, 746, 753, 789

(56) References Cited

U.S. PATENT DOCUMENTS

| | | | |
|---|---|---|---|
| 5,323,354 | * | 6/1994 | Hadano ................................. 370/518 |
| 5,602,882 | * | 2/1997 | Co et al. ................................ 370/518 |
| 5,608,731 | * | 3/1997 | Upp et al. ............................. 370/518 |

\* cited by examiner

*Primary Examiner*—Dang Ton
(74) *Attorney, Agent, or Firm*—Stuart T. Auvinen; G. Donald Weber, Jr.

(57) ABSTRACT

A hybrid data parallel/serial data transfer system with phase adjustment and symbol coding for switching digital data packets in order to facilitate massive high speed, high capacity transfer of information with a limited number of signal lines. The transfer of information is processed over cross-bar networks. Much higher data transfer speed is possible than in a conventional serial data transfer. Moreover, the bits or Tera bits can be transferred easily over long distances. Data is transmitted over a communication link or trunk consisting of one of more cross-bar networks. Each message is transmitted as a sequence of groups of data bits, the bits in each group are transmitted in parallel over the trunk wherein each line or path carries a signal and each message is preceded by a serial start pattern. The receiver comprises a plurality of decoders for receiving data signals from the trunk. The arrangement overcomes the problem of data skew due to different transmission times over the lines of the trunk.

20 Claims, 4 Drawing Sheets

DATA SWITCHING SYSTEM WITH CROSS BAR TRANSMISSION

BACKGROUND

1. Field of the Invention

A hybrid data parallel/serial data transfer system, in general, and a data transfer system with phase adjustment and symbol coding for switching digital data packets via a cross bar network in order to facilitate massive high speed transfer of information with a limited number of signal lines, in particular.

2. Prior Art

Traditionally, data transfer can take one of two forms, viz. serial or parallel. For high speed transfers, the serial stream will, typically, need to be a synchronous data stream, although asynchronous serial transfer is possible.

Conventional serial transfer, either synchronous or asynchronous, converts a byte or symbol into a single bit stream, usually with a serial clock signal included within the byte or symbol. With an embedded clock included within the data transmission, the symbol or byte can be accurately recovered. However, this process effectively results in a parallel-to-serial-to-parallel data transfer over a single signal line or path.

Conventional parallel transfer involves sending data into a parallel bus which is, typically, connected to a buffer register. After some defined delay, which allows the data line to be settled, a "Strobe" signal is then supplied to the buffer register in order to latch data into the receiving circuit or register.

Conventional high speed parallel transfer of data involves phase adjustment circuits. Each individual bit of a data transfer is fed into various delay lines to insure that the several bits arrive at the receiving data latch at the same time and that the "Strobe" arrives somewhat later with sufficient margin for the data to be reliably latched. This design limits the speed of the transfer by requiring the cycle time to be larger than the phase adjustment time of the various signal paths. Furthermore, this design requires the data signal to be valid for longer then the largest delay, which further limits the speed of the transfer.

An even higher-speed conventional parallel transfer uses synchronous transfer on each of the plurality of lines. Each line is a standard synchronous serial transfer line complete with a unique sync symbol ("SYNC"). A transmitting circuit sends a byte or data to each individual line to be sent out after the initial "SYNC" symbol. Thus, for N lines, N symbols are required. In addition, each line may have an uneven length depending upon whether or not the total bytes of the transmission are divisible by N. If not, some padding bytes will be needed to fill the void which represents a further waste of bandwidth.

CROSS REFERENCE

Reference is made to co-pending application entitled HYBRID INTERFACE FOR PACKET DATA SWITCHING by Henry P. Ngai, filed on Nov. 24, 1997, bearing Ser. No. 08/977,663 (NEEC-1) now U.S. Pat. No. 6,128,319.

SUMMARY OF THE INVENTION

The invention allows parallel transfer of data without the limitation imposed by the phase difference of the different signal paths. The invention includes a transmitter which converts a byte (typically 8 bits) into a 9 bit data symbol. In order to be considered valid data, the 9 bit symbol must contain at least one bit which is a "0". Each bit of a symbol is then transferred on a different signal line using a high speed data transfer. Thus, each of the data bits of the symbol is transferred independent of the others. The data bits are reassembled at the receiver. Much higher data transfer is possible than in a conventional serial data transfer. Multi-giga bit or Tera bits can easily be transferred over a long distance using this invention.

Furthermore, there is no requirement for a unique "SYNC" symbol for each of the N+1 lines, making the system a lot more economical in bandwidth than the conventional design. Instead, a single, unique symbol comprising all zeroes followed by a symbol comprising all ones for a total of two symbols for N+1 lines is necessary to indicate the start of a transmission. This provides a much more economical approach for a larger number of N.

DESCRIPTION OF A PREFERRED EMBODIMENT

Figure 1:
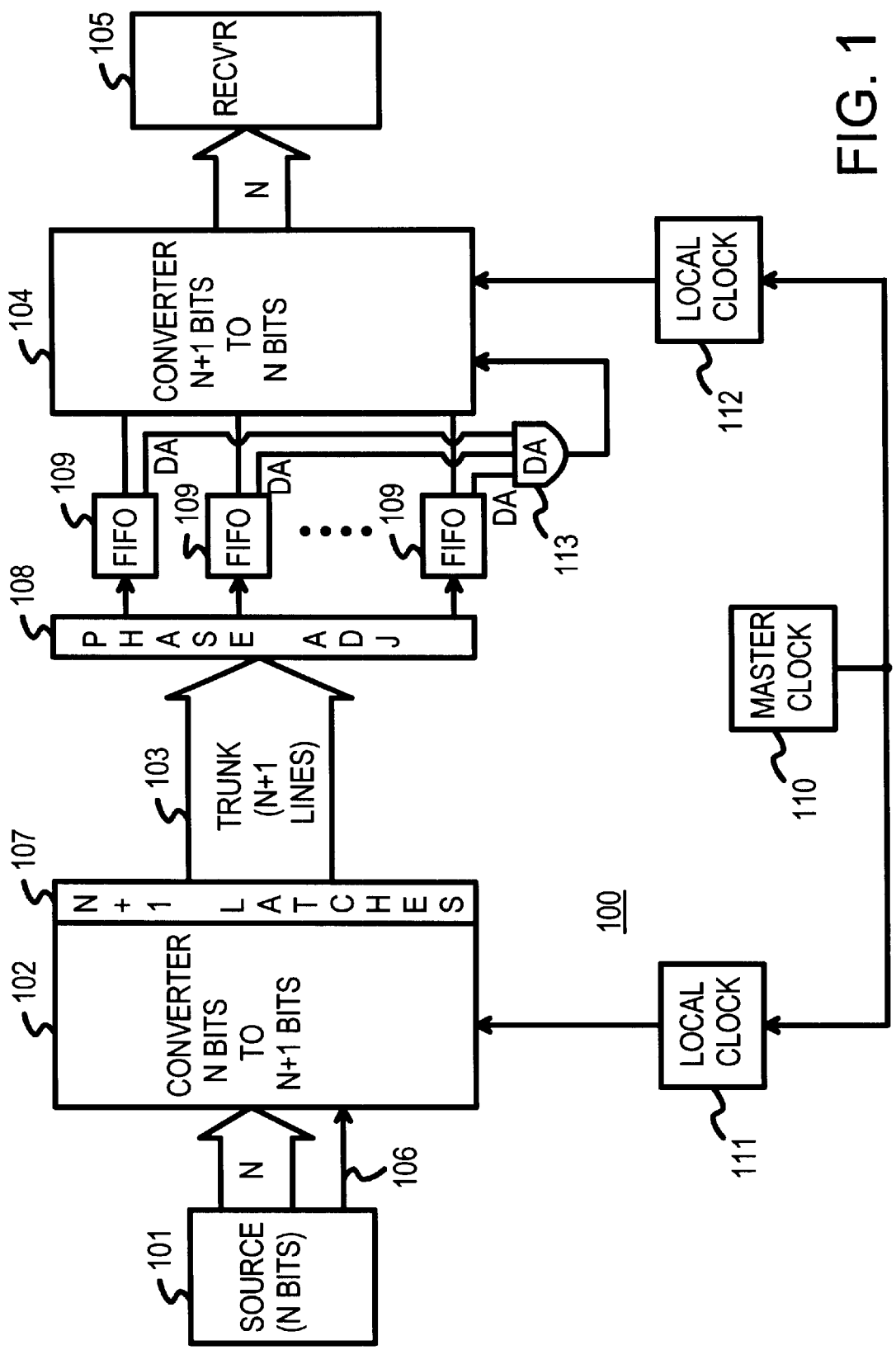
FIG. 1 is a block diagram representation of a transmission system known in the prior art.

Referring now to FIG. 1, there is shown a schematic representation of one embodiment of an interface system 100 described in the co-pending application referenced supra and incorporated herein by reference thereto.

System 100 includes any suitable source 101 which generates a suitable data signal, which is conventionally referred to as a byte or symbol. The signal is comprised of a number of individual signals, referred to as bits. The number of bits per symbol can vary and is, for this discussion, referred to as N. For the purposes of this discussion, it is assumed that the bits of a byte or symbol have been configured in parallel form for application to the converter 102. The converter 102 converts the N bits received at the input thereof to N+1 bits at the output thereof. The operation of the converter 102, per se, is described in detail in the co-pending application.

A control signal line 106 is connected between source 101 and converter 102. This line carries and transmits a control signal which selectively causes data to be transferred from source 101 to converter 102.

A trunk 103 or transmission line includes at least N+1 lines or paths which are connected to receive output signals from the converter 102. The trunk is, typically, any suitable signal carrier such as a metallic conductor, a fiber optic cable or any appropriate medium for carrying the output signals produced by converter 102.

The trunk 103 is connected to converter 104 which converts the N+1 signals applied thereto by the trunk 103 to N signals. Once again the construction of converter 104 is conventional in the art.

The N bit output signal produced by converter 104 is supplied to the receiver 105 which then operates on the N bit signal as desired.

For purposes of controlling the operation of the system 100, a master clock 110 which produces a relatively low frequency signal is provided. The master clock 110 is connected to supply the clock signal to local clocks 111 and 112 which multiply the frequency of the clock signal produced by master clock 110. This arrangement permits the local clock signals to be reasonably well synchronized without the inherent timing problems often encountered by a high frequency signal propagated over long lines.

Each input signal line in converter 102 has an output latch 107 which is, effectively, activated by and outputs bits synchronously with the local clock signals from local clock 111. Thus, the outputting of signals by converter 102 is synchronized with the system operation.

Each signal line in trunk 103 is connected to a separate phase adjust circuit 108 which is utilized to adjust for any phase changes which may be caused in the N+1 signals due to, for example, any variance in length between (among) the several N+1 lines in trunk 103.

The phase adjust circuits 108 supply the N+1 signals to the inputs of N+1 first-in, first-out (FIFO) buffers 109. The buffers 109 store the input signals in a conventional manner. The outputs of the FIFO buffers 109 are connected to the N+1 inputs of converter 104.

In addition, the buffers 109 are connected to the inputs of a suitable control logic circuitry 113 (exemplified by the AND gate). In particular, the buffers 109 each produce a Data Available (DA) signal when a bit has been received by and migrated to the front of the buffer 109 (for processing by converter 104). When the DA signal from each of the buffers 109 becomes true (i.e. each buffer has a bit ready for transfer to converter 104, logic circuit 113 will be activated and, thus, turn on the converter 104 to remove (or accept) an N+1 bit symbol from the buffers for conversion to an N bit symbol by converter 104. The output of the control logic 113 is supplied to the converter 104 when all of the buffers 109 are synchronized for signal output. Thus, the signals supplied to the converter 104 are synchronized with the input signals (from converter 102) in terms of time and phase with a minimum of hardware or software control.

Moreover, each of the trunk lines and associated phase adjust circuit 109 and buffer 109 is responsible for a separate bit stream. The bit streams are put together to receive the transmitted data symbol in parallel format. When each FIFO 109 has valid data, a single symbol is recovered by the converter 104 at the receiving end of the transmission system.

Since there is virtually no limitation due to phase or timing adjustment, the parallel data transfer can take place in a very high speed manner making it possible to transfer data with high speed when the data path is made N+1 bits wide.

The symbol conversion process is a significant part of this invention. By requiring at least one zero in each valid data transfer, an all "1" symbol can be placed at the end of a transfer to signal "end of transfer".

Another significant aspect of this invention is the use of a unique symbol in the parallel domain instead of the serial domain. Doing so limits the number of symbols to two, i.e. an all "0" symbol and an all "1" symbol required for any number of N lines. Conversely, the conventional high speed hybrid transfer technique in the prior art uses N number of symbols, one for each line.

As noted, the system of the invention allows for high speed data packet transfer. That is, using conventional serial transfer, a phase lock loop, or PLL, circuit is needed to recover the clock from each data stream. Because time is required for the PLL to become in sync before data can be retrieved, a significant amount of bandwidth is wasted in such prior art designs.

Conventional higher-speed transfer system using synchronous transfer requires a unique symbol at the beginning of each packet, as well as special packets to ensure PLL synchronization for each line. Thus, for an N line system, N such symbols will be necessary. Contrariwise, the system of this invention only uses two symbols, viz. an all "0" symbol and an all "1" symbol, for each packet, regardless of the number of lines.

In the inventive system, both the transmitter and the receiver use the same master clock, which is used to generate a much higher frequency for each of the local clocks, i.e. transmission and recovery clocks. Since both local clocks are in sync, only a phase adjustment circuit may be necessary to recover the data. Such a phase adjustment circuit requires much less time to recover the data, thus making it possible for high speed packet exchanges among different source and destination pairs using a high speed analog switch without devoting much bandwidth on the PLL circuit.

Figure 2:
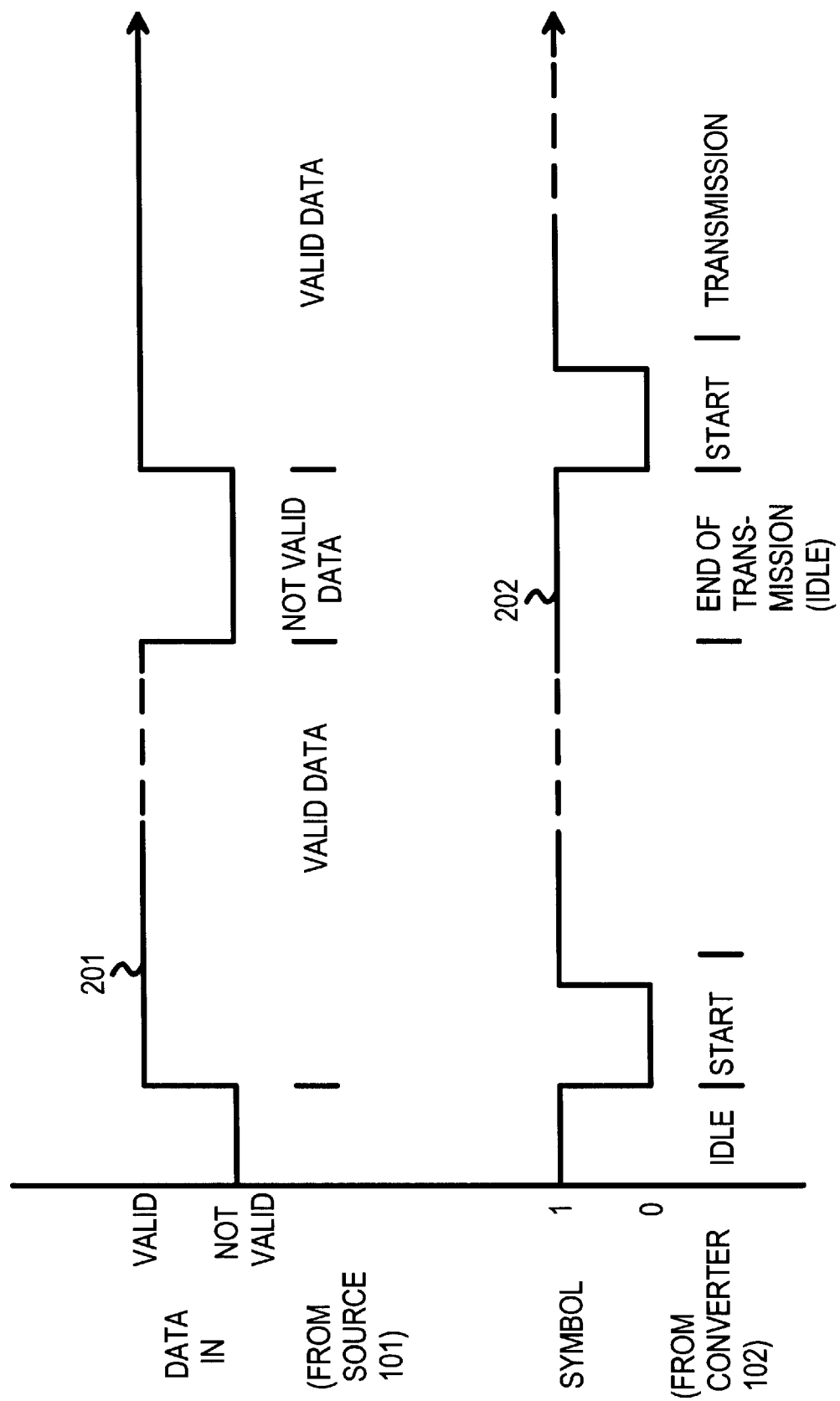
FIG. 2 is a graphical representation of the operation of the system of the instant invention.

Referring now to FIG. 2, there is shown a graphical representation of system operation. The output from the source 101 is shown as either Valid Data or Not Valid Data on the data line 201. The specific data being transmitted is not depicted. Likewise, the symbol supplied by the converter 102 and represented by line 202 is shown as all "1's" or all "0's" during the transmissions. Again, the specific symbol is not depicted. (The dashed line portions of lines 201 and 202 are merely indicative of an unspecified signal length and are not intended to be limitative of the invention.

Figure 3:
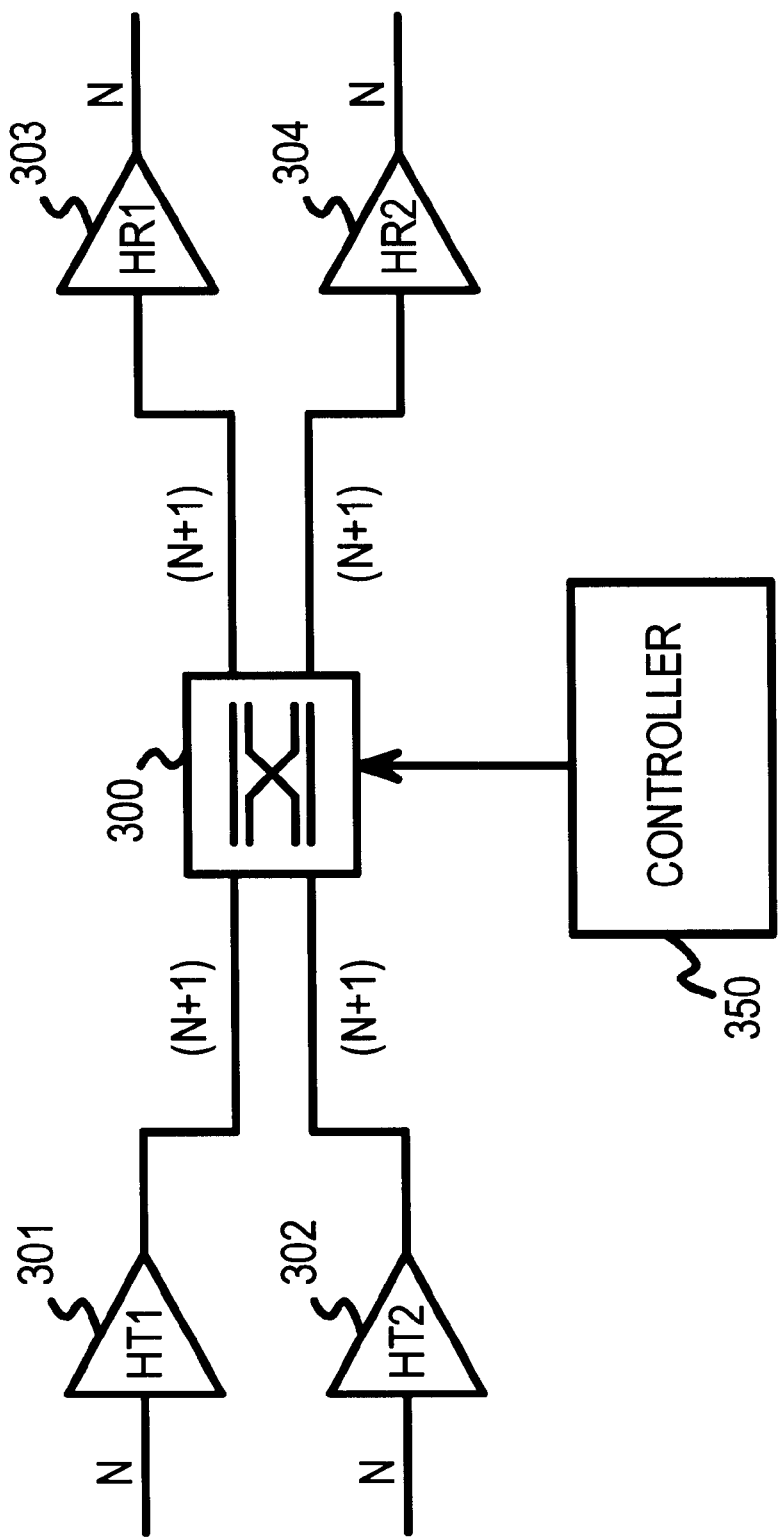
FIG. 3 is a block diagram representation of a very high speed switch design using the system shown in FIG. 1 with a cross bar circuit.

Referring now to FIG. 3, there is shown a very high speed switching design obtained by combining a plurality of switches shown in FIG. 1 with a traditional cross-bar network 300.

Typically, in this system, the input transmitters 301 and 302 are each the same as the transmitter shown in FIG. 1. Likewise, the receivers 303 and 304 are each the same as the receiver shown in FIG. 1. The cross-bar network 300 operates as the trunk line shown in FIG. 1. However, the network 300 selectively permits transmission from transmitter 301 to receiver 303 or 304. Likewise, network 300 selectively permits transmission from transmitter 302 to receiver 304 or 303. The transmission path is selected by the controller 350 which is schematically shown. That is, controller 350 supplies a control signal to network 300 to determine which connector is made between the transmitters and the receivers. The controller 350 may be controlled by an external control mechanism which is also operative to contact the operation of the appropriate transmitter and receiver in order to prevent inadvertent simultaneous transmission attempts.

In particular, the improved cross-bar network 300 includes two (2) inputs and two (2) outputs. With this network, the system can run at much higher speeds between an input port and an output port as can be done with a conventional cross-bar using standard high speed serial links. Since each serial link of the improved cross-bar can run at the same speed of a single conventional serial link, t he speed of the hybrid trunk link over the switch is equal to N times the speed of each conventional serial link over a conventional cross-bar.

Figure 4:
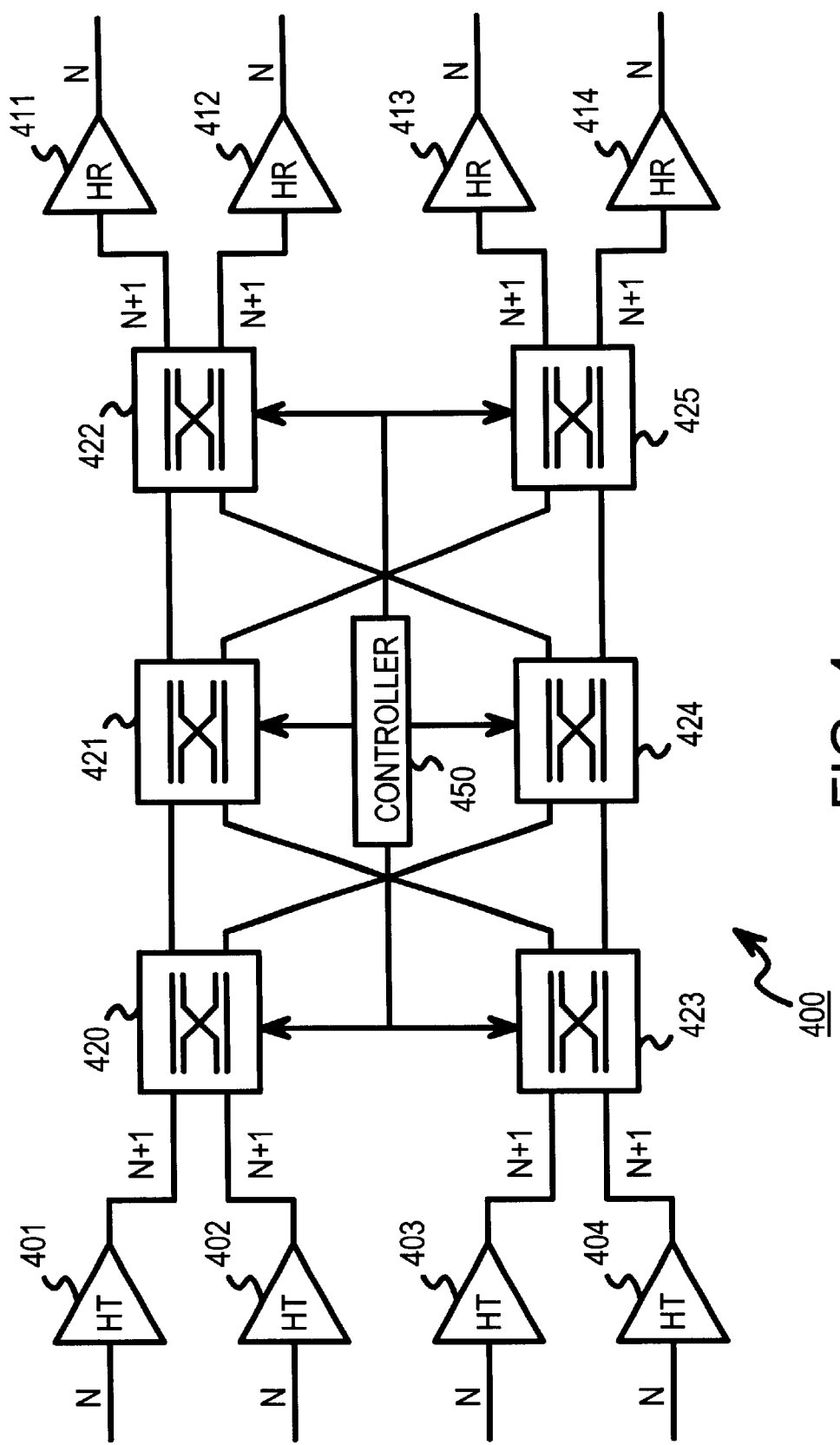
FIG. 4 is a block diagram representation of a very high speed, high capacity switch design using the system shown in FIG. 1 with a cross bar circuit.

Referring now to FIG. 4, there is shown a very high speed, high capacity switch system design obtained by combining a plurality of hybrid transmitters and receivers as shown in FIG. 1 with a plurality of conventional cross-bar networks as the transmission line.

The improved cross-bar network with four (4) inputs and four (4) outputs can operate at much higher speeds than traditional cross-bar networks using a single serial transmission for each input and output. For example, the improved cross-bar network, with a byte wide transmission, can achieve either (8) times the bandwidth per port over the conventional cross-bar using a single line serial transfer. When compared to a conventional cross-bar using conventional parallel transmission of the same number of lines per port, the speed is much higher because of the higher bit rate allowed on each of the serial lines vs. each of the data lines of a conventional parallel transfer.

The improved cross-bar is also superior to the conventional cross-bar with conventional high speed parallel transfer using standard synchronous link due to the reduced number of symbols required on an N line transmission from N to 2, i.e. an all zero and an all one symbol. This reduction in symbol dependency translates to smaller overhead per frame and allows switching of frames by a conventional cross-bar network with higher data bandwidth capacity. For small frame size transmission over a fixed baud rate transmission path passing through a conventional cross-bar, it provides superior payload compared to traditional high speed parallel transmission due to smaller overhead on reduced symbols.

Typically, in this system, each of the input transmitters 401 through 404 is the same as the transmitter shown in FIG. 1. Likewise, each of the receivers 411 through 414 is the same as the receiver shown in FIG. 1. The cross-bar network 400 operates as the trunk line shown in FIG. 1. However, the network 400 selectively permits transmission from transmitter 401 to any one of receivers 411 through 414. Likewise, network 400 selectively permits transmission from transmitter 402 (or transmitters 403 or 404) to any one of receivers 411 through 414.

The transmission path is selected by the controller 450 which is schematically shown. That is, controller 450 supplies a control signal to each of the cross-bar networks 420–425 which comprise network 400 to determine which connection is made between the transmitters and the receivers. The controller 450 may be controlled by an external control mechanism which is also operative to contact the operation of the appropriate transmitter and receiver in order to prevent inadvertent simultaneous transmission attempts.

In particular, the improved cross-bar network 400 includes four (4) inputs and four (4) outputs with six (6) individual cross-bar networks 420 through 425, inclusive. With this network 400, the system can run at much higher speeds per port using the same baud rate per line as a conventional cross-bar with a single serial transmission per port. The cross-bar network 400, with a port of 9 bits wide, can achieve eight (8) times the bandwidth of the conventional single serial line cross-bar network switching system.

Conventional parallel transfer will not be able to match the speed of the improved cross-bar of the instant invention. For example, when the transmission path through the cross-bar network changes, the phase of the transmitted signal needs to be readjusted. Another significant complication is the difference in delay introduced by variations in length of the transmission paths. Furthermore, when the transmission path becomes long, as in a high port count switch design, or even distributed switch design, the speed of the conventional parallel bus will slow down. However, the modified cross-bar, using hybrid transmission as taught herein, will not be affected and can still run at full speed.

Conventional high speed parallel transmission is inferior to the system of this invention for several reasons as noted herewith:

1. A conventional system uses a unique symbol at each line, thus increasing latency before data can be extracted and received at the receiving port.
2. A conventional system sends each byte of a frame over a different serial link, creating problems with re-synchronization of byte ordering at the receiving end.
3. A conventional system creates wasted cycles in an N line transmission system when the number of bytes on a frame is not divisible by N, whereby extra cycles need to be inserted into the transmission process.

Conventional parallel transfer will have a hard time matching the speed of the improved cross-bar. Limited by setup time, hold time, propagation delay and jitter introduced by the variance in the different transmission path, the conventional parallel transfer will have to run at a much slower baud rate per transmitted data line. The result is much lower capacity in comparing to the improved cross-bar. When the transmission path through the cross-bar changes, jitter also changes. The longer the transmission path, the larger the jitter, and the larger the skew between each data bit and the data strobe as they arrive on different transmission lines. The higher skew means larger margin, and the maximum transmission data rate decreases. Furthermore, when the transmission line becomes long, as in a high port count switch design, the speed of the conventional parallel bus will slow down. However, the modified cross-bar, using hybrid transmission as taught herein, will not be affected and can still run at full speed.

Line coding on each signal line is not necessary whereby overhead is minimized. As can be seen from the above description, a data packet can be transmitted with only 3 cycles of overhead. Clearly, this system represents a huge savings in system operation compared to conventional serial data transmission using PLL for clock and data recovery.

Thus, there is shown and described a unique design and concept of a hybrid data parallel/serial data transfer system which facilitates high speed transfer of information. The particular configuration shown and described herein relates to a system with phase adjustment and symbol coding for switching digital packets. While this description is directed to a particular embodiment, it is understood that those skilled in the art may conceive modifications and/or variations to the specific embodiments shown and described herein. Any such modifications or variations which fall within the purview of this description are intended to be included therein as well. It is understood that the description herein is intended to be illustrative only and is not intended to be limitative. Rather, the scope of the invention described herein is limited only by the claims appended hereto.

What is claimed is:

1. A data transmission system including,
   a plurality of transmitters, each of said transmitters including a first converter means for converting N input signals into N+1 output signals,
   trunk means between said first converter means and a receiver, for transferring the N+1 output signals and outputting N+1 input signals to the receiver,
   said trunk means comprising a cross-bar network,
   a plurality of receivers, each of said receivers including second converter means for converting the N+1 input signals from the cross-bar network into N output signals, said second converter means connected to receive the N+1 input signals from said cross-bar network;

a master clock signal generator for generating a master clock signal at a clock frequency, a first local clock signal generator connected to receive said master clock signal from said master clock signal generator and supplying a first local clock signal to said first converter means at M times said clock frequency; and a second local clock signal generator connected to receive said master clock signal from said master clock signal generator and supplying a second local clock signal to said second converter means at M times said clock frequency.

2. The system recited in claim 1 including, source means connected to supply N input signals to said first converter means.

3. The system recited in claim 1 including, receiver means connected to receive N output signals from said second converter means.

4. The system recited in claim 1 wherein each receiver includes phase adjusting circuitry connected to receive the N+1 input signals and adjust any phase differences therebetween prior to supplying the N+1 input signals to said second converter means.

5. The system recited in claim 4 wherein each receiver includes buffer circuitry connected to said phase adjusting circuitry to store the N+1 input signals after phase adjustment and prior to supplying the N+1 input signals to said second converter means.

6. The system recited in claim 5 including, logic circuitry connected to said buffer circuitry to control the supplying of the N+1 input signals to said second converter means.

7. The system recited in claim 1 wherein, said cross-bar network includes a plurality of cross-bar circuits.

8. The system recited in claim 6 wherein the buffer circuitry includes:

N+1 first-in-first-out FIFO buffers, each of the N+1 FIFO buffers for storing data from a different one of the N+1 input signals.

9. The system recited in claim 8 including, logic circuitry connected to said buffer circuitry to control supplying of the N+1 input signals to said second converter means;

wherein outputs of the N+1 FIFO buffers are input to the logic circuitry and input to the second converter means.

10. The system recited in claim 9 wherein:

the logic circuitry is an AND gate, wherein the logic circuitry controls supplying of the N+1 input signals to the second converter means when all outputs from the N+1 FIFO buffers are in a high state, and the second converter means being synchronized to data from the N+1 FIFO buffers by an all-ones symbol transmitted from the first converter means, the all-ones symbol being a parallel data word having all N+1 bits in the high state.

11. The system recited in claim 9 wherein:

synchronization symbols transmitted over the N+1 output signals are symbols in a parallel domain.

12. The system recited in claim 9 wherein the trunk means comprises:

N+1 trunk lines are for carrying the N+1 output signals in parallel over separate signal lines in the N+1 trunk lines, the N+1 trunk lines having different delays, causing skews among signals in the N+1 output signals, wherein the phase adjusting circuitry adjusts for the skews.

13. A hybrid parallel/serial data transfer network comprising:

a plurality of hybrid parallel transmitters, each transmitter having:
a first converter, receiving an input data word of N bits in parallel, for converting the input data word into a symbol of N+1 bits;
line drivers, receiving the symbol of N+1 bits, for driving a group of N+1 trunk lines in parallel with the symbol of N+1 bits;

a plurality of hybrid parallel receivers, each receiver having:
phase adjustors, receiving the symbol of N+1 bits transmitted over the N+1 trunk lines, for adjusting timing of the N+1 bits within the symbol;
N+1 buffers, coupled to receive N+1 bits from the phase adjustors, for independently buffering N+1 bit streams;
a second converter, receiving N+1 outputs from the N+1 buffers, for converting the symbol of N+1 bits to an output data word of N bits; and a crossbar switch, coupled between the transmitters and receivers, the crossbar switch receiving groups of N+1 trunk lines from the transmitters, and driving groups of N+1 trunk lines to the receivers, the crossbar switch receiving one group of N+1 trunk lines from each of the plurality of hybrid parallel transmitters, the crossbar switch for connecting a group of N+1 trunk lines from a transmitter to an group of N+1 trunk lines to a receiver.

14. The hybrid parallel/serial data transfer network of claim 13 wherein the phase adjustors compensate for timing skews between different signals within the N+1 trunk lines, and for timing skews through the crossbar switch.

15. The hybrid parallel/serial data transfer network of claim 13 wherein the crossbar switch includes a plurality of 2-input, 2-output dual-port switches, each dual-port switch for connecting a first group of N+1 trunk lines from a first transmitter to either a third or a fourth group of N+1 trunk lines to one of two receivers, and also for connecting a second group of N+1 trunk lines from a second transmitter to either the fourth or third group of N+1 trunk lines that the first transmitter is not connected to.

16. The hybrid parallel/serial data transfer network of claim 15 further comprising:

a sync symbol detector, receiving outputs from the N+1 buffers, for detecting a unique symbol pattern of the N+1 bits, the unique symbol pattern not representing any input data word of N bits, the sync symbol detector triggering the second converter when the unique symbol pattern is detected.

17. The hybrid parallel/serial data transfer network of claim 16 wherein the N+1 buffers are first-in-first-out FIFO buffers, separately buffering different bits of the N+1 trunk lines.

18. The hybrid parallel/serial data transfer network of claim 17 wherein the unique symbol pattern includes a pattern of all zero bits a pattern of all one bits.

19. The hybrid parallel/serial data transfer network of claim 17 wherein N is 8 and N+1 is 9, wherein the crossbar switch connects groups of 8 trunk lines from a transmitter to a receiver.

20. The hybrid parallel/serial data transfer network of claim 17 further comprising:
a master clock generator for generating a master clock;
wherein each transmitter further includes:
a first clock multiplier, receiving the master clock, for generating a first clock having a first frequency being a multiple of a frequency of the master clock, the first clock for timing transmission of the symbol of N+1 bits from the first converter to the crossbar switch;

wherein each receiver further includes:
a second clock multiplier, receiving the master clock, for generating a second clock having a second frequency being a multiple of a frequency of the master clock, the second clock for timing reception of the symbol of N+1 bits to the second converter from the crossbar switch.

* * * * *